United States Patent
Hamaguchi

(10) Patent No.: US 10,659,648 B2
(45) Date of Patent: May 19, 2020

(54) PRINTING APPARATUS AND TEXT INPUT PROGRAM

(71) Applicant: SEIKO EPSON CORPORATION, Tokyo (JP)

(72) Inventor: Yoshihiro Hamaguchi, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/240,851

(22) Filed: Jan. 7, 2019

(65) Prior Publication Data

US 2019/0215416 A1    Jul. 11, 2019

(30) Foreign Application Priority Data

Jan. 9, 2018   (JP) ................................ 2018-001112
Jun. 5, 2018   (JP) ................................ 2018-108058

(51) Int. Cl.
  *H04N 1/32*       (2006.01)
  *G06K 9/34*       (2006.01)
  *H04N 1/00*       (2006.01)
  *G06F 40/109*     (2020.01)

(52) U.S. Cl.
  CPC ....... *H04N 1/32219* (2013.01); *G06F 40/109* (2020.01); *G06K 9/348* (2013.01); *H04N 1/00384* (2013.01)

(58) Field of Classification Search
  CPC ........... H04N 1/32219; H04N 1/00384; G06K 9/348; G06F 17/214
  USPC ...................................................... 358/1.14
  See application file for complete search history.

(56) References Cited

U.S. PATENT DOCUMENTS

| | | | | |
|---|---|---|---|---|
| 3,675,203 A | * | 7/1972 | Baumann | G06K 9/74 382/212 |
| 5,287,487 A | * | 2/1994 | Priem | G06F 12/0862 711/204 |
| 2007/0100492 A1 | * | 5/2007 | Idaka | G05B 19/4086 700/166 |
| 2008/0117448 A1 | * | 5/2008 | Ijams | G06F 17/248 358/1.15 |

OTHER PUBLICATIONS

"Virtual Body" retrieved at http://www.morisawa.co.jp/culture/dictionary/1964.

* cited by examiner

*Primary Examiner* — Tammy Paige Goddard
*Assistant Examiner* — Darryl V Dottin
(74) *Attorney, Agent, or Firm* — Global IP Counselors, LLP

(57) ABSTRACT

In S210, a character size and an inter-column size are calculated using a virtual body size in S206, and the character size and an inter-character size (inter-column size) are reflected in properties of each text box. In step S301, a position and a size of each text box are set, in step S302, the character size is set in the property of each text box, and in the following step S304, the inter-character size is set in the property so that characters do not overlap in each text box. Thereafter, in S306, the text boxes are superimposed so that reference frames of adjacent characters are in contact with each other.

10 Claims, 12 Drawing Sheets

FIG. 7A
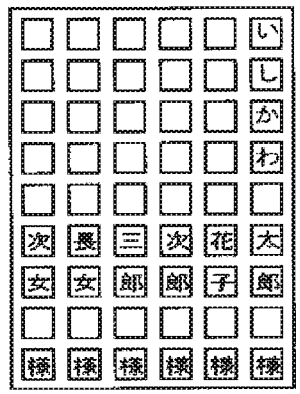
FIG. 7B  TB3
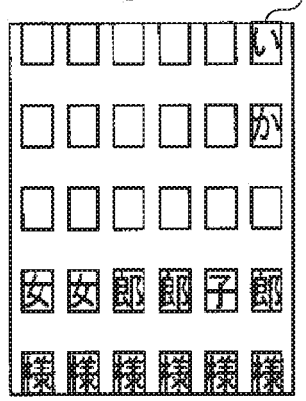
FIG. 7C  TB4
FIG. 7D  TB3, TB4
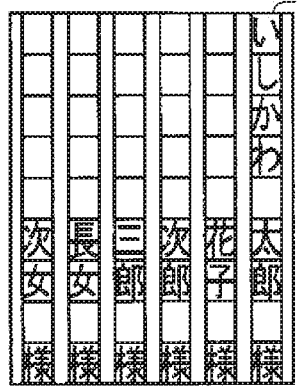

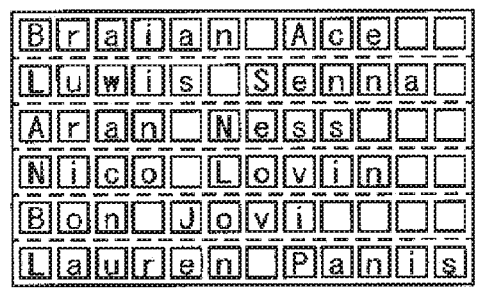
FIG. 10A
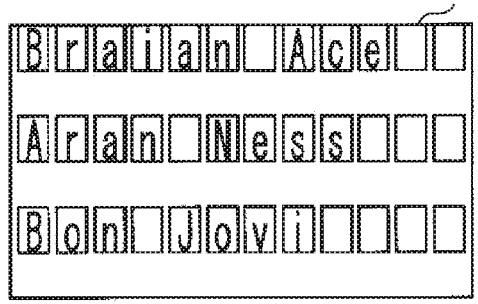
FIG. 10B    TB5
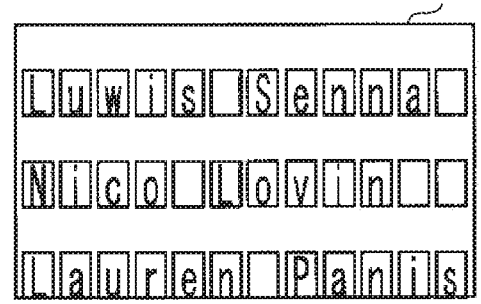
FIG. 10C    TB6
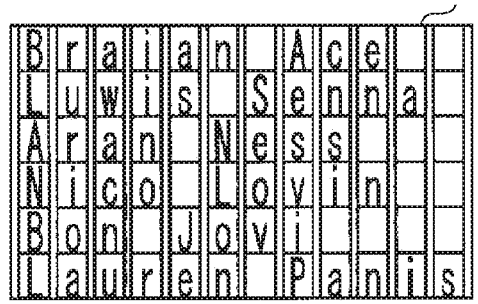
FIG. 10D    TB5, TB6

PRINTING APPARATUS AND TEXT INPUT PROGRAM

BACKGROUND

1. Technical Field

The present invention relates to a printing apparatus and a text input program used for a character printing with an appropriate character arrangement.

2. Related Art

As an example of a printing apparatus used for printing an addressee of a postcard or the like, when printing an addressee side, a printing area of the addressee is one fixed area, and within the fixed area, each character which constitutes a last name, a first name, and an honorific title is connected together and printed as one line. As an example, if the last name is "佐藤", the first name is "一郎", and the honorific title is "様", combine each of these characters and make one line like "佐藤一郎様".

Also, there may be joint addressees instead of one addressee. In this case, insert a line feed and add a line of a last name (the second person and subsequent may be omitted), a first name, and an honorific title in the same way.

For example, "佐藤一郎様 (line feed) 佐藤次郎様" is obtained.

When the number of joint addressees increases, the width of the fixed area is not sufficient, accordingly, the joint addressees cannot fit in the fixed area with a default font size (character size). Therefore, a character size in the fixed area may be calculated and the font size may be reduced uniformly.

FIG. 12 shows a relationship between a reference frame and a virtual body in font data generally used in Japanese.

The font data includes data indicating whether or not rendering is performed inside the reference frame corresponding to a character size. The outermost frame of an area to be rendered matches with the reference frame, and the rendering does not occur outside the reference frame.

The outermost rendering position is a position of the reference frame. Note that, the character size indicates the reference frame size.

For example, if there is no inter-line (inter-line=0), it seems likely that characters are arranged perfectly in adjacent lines so that there is no gap. However, in actuality, a small area is secured around the character by the virtual body set outside the reference frame in a font rendering specification, and if it is printed as it is, a small gap is formed between adjacent characters as joint addressees.

Also, not only in the horizontal direction where characters are adjacent after inserting the line feed but also in the vertical direction where characters are continued, likewise, when a last name, a first name, and an honorific title become longer, the character size is reduced. Therefore, only the font size reduced with gaps remaining. It is the same in other languages that there is a small gap around the character itself.

http://www.morisawa.co.jp/culture/dictionary/1964 is an example of the related art.

As described above, an improvement on how characters are arranged has been required.

SUMMARY

An advantage of some aspects of the invention is to provide an apparatus and a text input program for inserting a character larger than a specified area.

According to an aspect of the invention, there is provided a printing apparatus including an input unit that receives an input from a user, a printing mechanism, and a processor, in which the processor receives an input of a character string from the user, allocates characters of the character string to at least two text boxes so that an adjacent character is inserted in a separate text box, sets a character size and an inter-character size in the text box so that a part of an outer frame of the adjacent character is placed inside an outer frame of a character, and controls the printing mechanism so that the text box is superimposed and printed to place the part of the outer frame of the adjacent character inside the outer frame.

According to another aspect of the invention, similarly, there is provided a text input program causes a computer to realize a function of receiving an input from a user, a function of controlling a printing mechanism, and a processor function, in which the function is to receive an input of a character string from the user, to allocate characters of the character string to at least two text boxes so that an adjacent character is inserted in a separate text box, to set a character size and an inter-character size in a text box so that a part of an outer frame of the adjacent character is placed inside an outer frame of a character, and to control the printing mechanism so that the text box is superimposed and printed to place the part of the outer frame of the adjacent character inside the outer frame. Note that, control of the printing mechanism includes control by instructing a driver program separately provided in the computer.

BRIEF DESCRIPTION OF THE DRAWINGS

The invention will be described with reference to the accompanying drawings, wherein like numbers reference like elements.

FIG. 4A, FIG. 4B, FIG. 4C, and FIG. 4D are schematic diagrams showing a specific image of the determination processing of the character size and the inter-character size of the addressee area.

FIG. 7A, FIG. 7B, FIG. 7C, and FIG. 7D are schematic diagrams showing a specific image of the determination processing of the character size and the inter-character size of the addressee area in a vertical direction.

FIG. 8 is a flowchart of a determination processing of a character size and an inter-character size relating to English characters or the like.

FIG. 10A, FIG. 10B, FIG. 10C, and FIG. 10D are schematic diagrams showing a specific image of the determination processing of the character size and the inter-character size of English characters.

DESCRIPTION OF EXEMPLARY EMBODIMENTS

Hereinafter, embodiments of the invention will be described with reference to the drawings.

Figure 1:
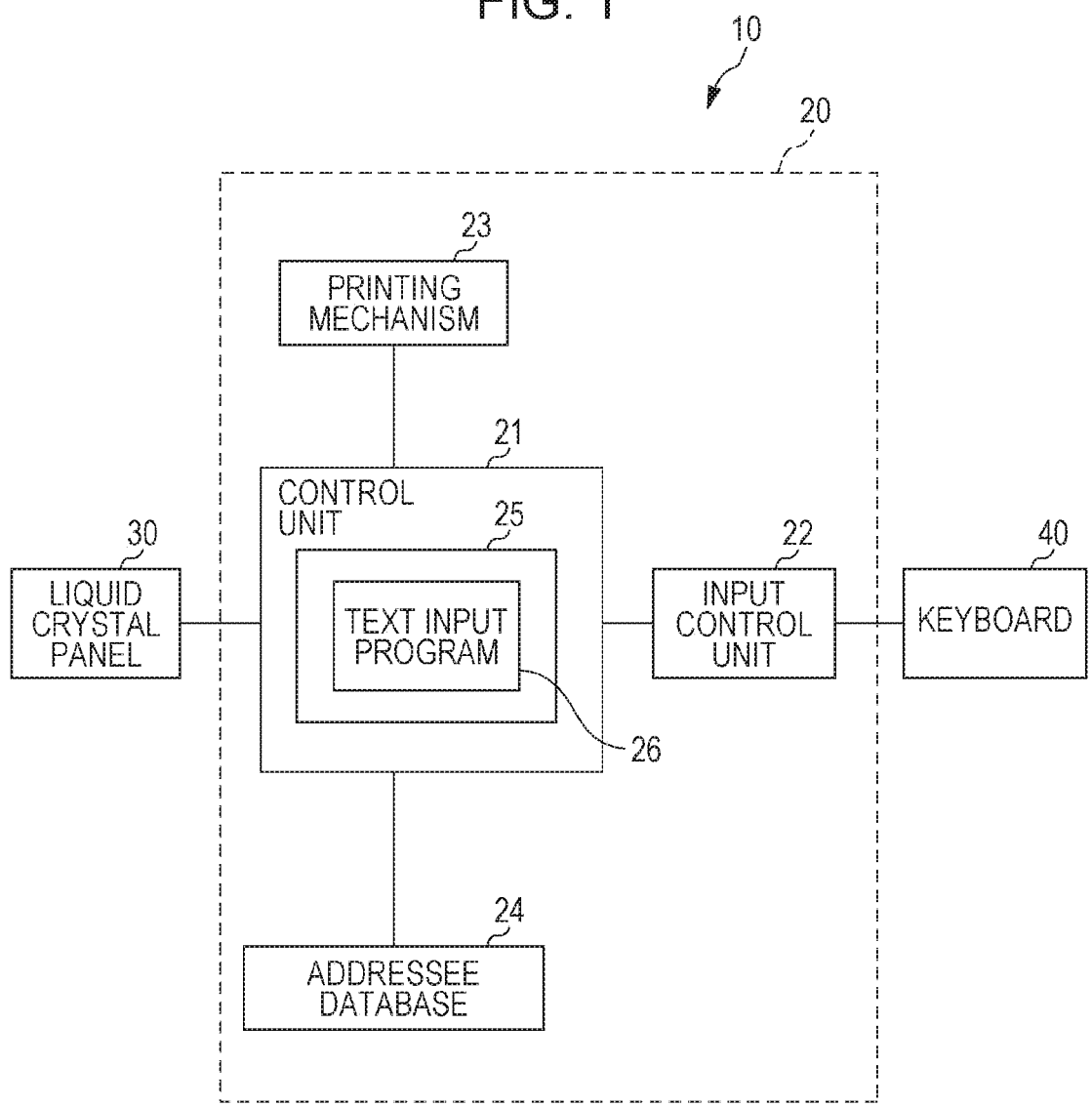
FIG. 1 is a schematic block diagram of a printing apparatus to which the invention is applied.

FIG. 1 is a block diagram showing a printing apparatus according to an embodiment of the invention.

In FIG. 1, the printing apparatus 10 includes a main body 20, a liquid crystal panel 30, and a keyboard 40. The main body 20 further includes a control unit 21, an input control unit 22, a printing mechanism 23, and an addressee database 24.

When a user operates the keyboard 40, the control unit 21 acquires the operation via the input control unit 22. When the user inputs an addressee as a character string, the control unit 21 adds, updates, and deletes the addressee database 24. The control unit 21 displays the input addressee on the liquid crystal panel 30 and controls the printing mechanism 23 in accordance with a predetermined operation from the keyboard 40 to execute an addressee writing on a postcard or an envelope. The control unit 21 includes a CPU, a ROM, a RAM, an interface, or the like configuring a computer and a processor in order to realize various controls, and these are realized as integrated circuits. The control unit 21 stores a text input program 26 in a predetermined memory 25 such as a ROM. Further, the liquid crystal panel 30, the keyboard 40, the input control unit 22, and the printing mechanism 23 also have their own control circuits and interfaces, respectively.

The block diagram is illustrated only by focusing on functions, and it is obvious that various configurations, modifications, and shared functions can be naturally realized in an actual configuration.

Figure 2:
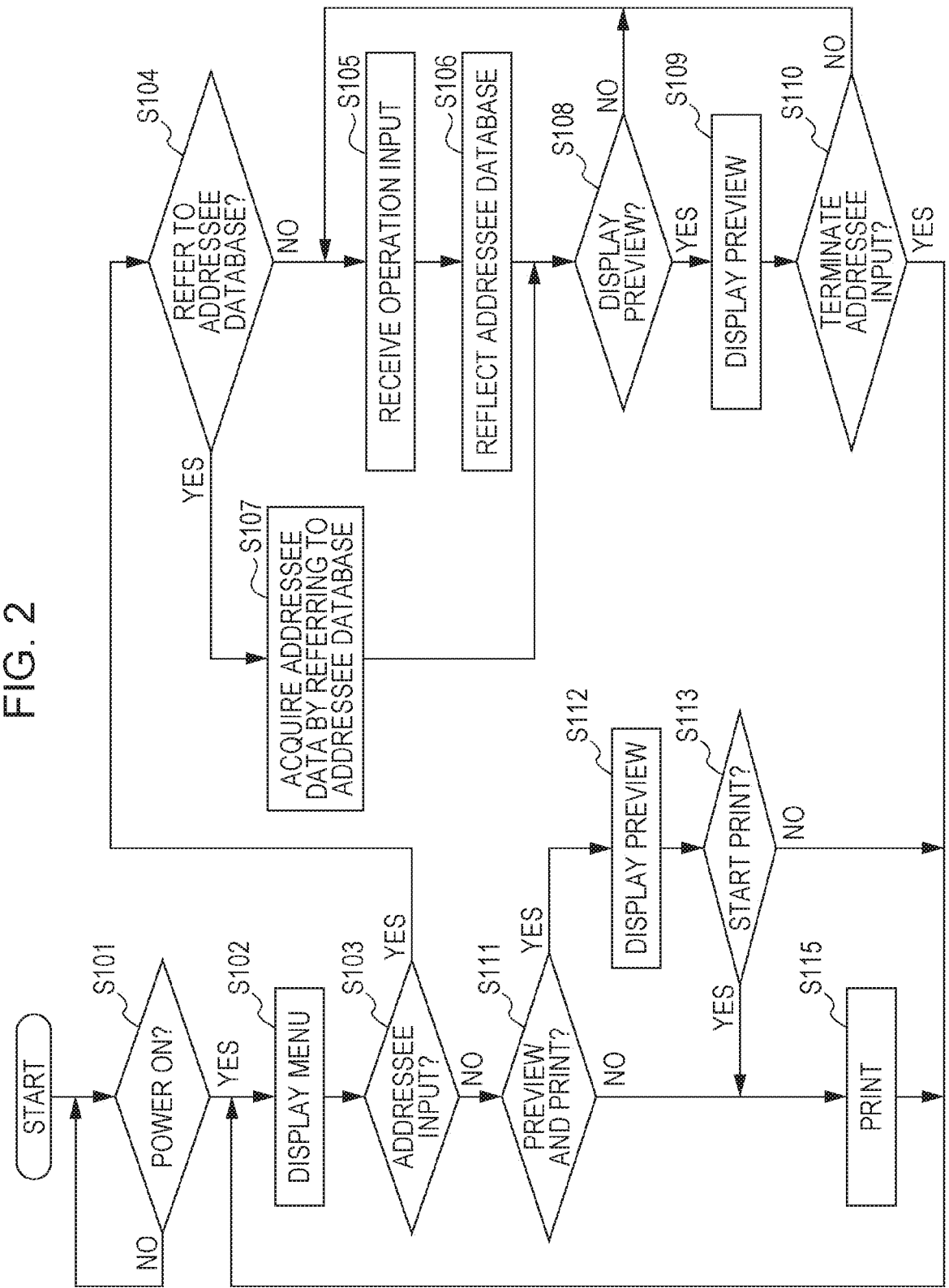
FIG. 2 is a flowchart of a main processing of the printing apparatus.

FIG. 2 is a flowchart of a main processing of the printing apparatus 10.

As an example, the control unit 21 waits for power on in step S101, and when the power is turned on, the control unit 21 displays a menu on the liquid crystal panel 30 in step S102. When an addressee input is prepared as one function and an operation to select the addressee input is performed, the control unit 21 acquires and determines the operation in step S103, and in a subsequent step S104, it is determined whether the input completed addressee is to be acquired by referring to the addressee database 24 or an operation to newly add the addressee. In the latter case, an operation input from the keyboard 40 is received in step S105, and reflected in the addressee database 24 in step S106. While reflecting the operation input on the addressee database 24, in step S108, the control unit 21 inquires of a user whether or not to display a preview of the addressee that received the input, and if the user wishes to display the preview, the control unit 21 displays the preview in step S109. Thereafter, in step S110, the control unit 21 inquires of the user whether or not to terminate the addressee input, and if the user wishes not to terminate the addressee input, the processing returns to step S105 to receive an operation input of the addressee. If the user wishes to terminate the addressee input, the processing returns to step S102 to display the menu.

Note that, for inquiries of each operation, the control unit 21 may display a pop-up to make an inquiry or display buttons corresponding to each operation, and may detect the presence or absence of an operation such as clicking the button.

When it is selected referring to the addressee database 24 to acquire the input completed addressee, the control unit 21 refers to the addressee database 24 and acquires predetermined addressee data in step S107. As an example, it is possible to display a search menu, list the corresponding items, and allow the user to select from among the listed addressee data. Then, in step S108 and subsequent steps, the selected addressee data is subjected to the preview display in the same manner as the input completed addressee data as described above. In order to perform processing for correcting the selected addressee data, the addressee data may be edited in step S105.

When the user selects a preview and a print from the menu display, the control unit 21 detects the selection in step S111 and displays the preview in step S112. In this state, when the user further selects to start printing, the control unit 21 detects the selection of the start of printing in step S113, and performs a printing in step S115. That is, the control unit 21 controls the printing mechanism 23 to cause the printing mechanism 23 to execute printing. When start printing is not selected, the processing returns to step S102 to display the menu.

When the user selects the print from the menu display, the control unit 21 detects the selection through the determination in steps S103 and S111, and performs the printing in step S115.

The above-described processing is merely an example, and various modifications are possible. For example, the addressee input, the preview, and the print may be made to move each other. The control unit 21 inputs the addressee in step S105, previews the addressee in step S109, and returns to the addressee input in step S105 in order to correct the addressee, however, preview may be performed again in step S109, and in that state, if the user selects to start printing, the printing in step S115 may be executed. Further, when the preview is performed in step S112, the addressee data may be edited in step S105 without starting printing, and then the printing may be performed via the preview.

Above explanations are merely examples of actual processing, and other functions may be realized, or equivalent processing may be realized by another technique.

In the printing processing of step S115 or the preview of steps S109 and S112, the control unit 21 needs to create a printing image. Common in both cases is a processing of rendering the printing image by using font data corresponding to addressee data in a printing area prepared in an addressee side of a postcard. A processing for displaying and a processing for printing are not exactly the same but they are almost the same, so in the following description, description will be given as common processing for the sake of convenience.

When rendering the printing image, it is necessary to determine a character size to be rendered in a predetermined printing area. When the printing area is a certain area on a printing medium such as a postcard, a text box overlapping the area is set in order to print a character, and font data is expanded in the text box to render the printing image. One text box may be set for one printing area, or a plurality of text boxes may be prepared for a superimposition printing.

Figure 3:
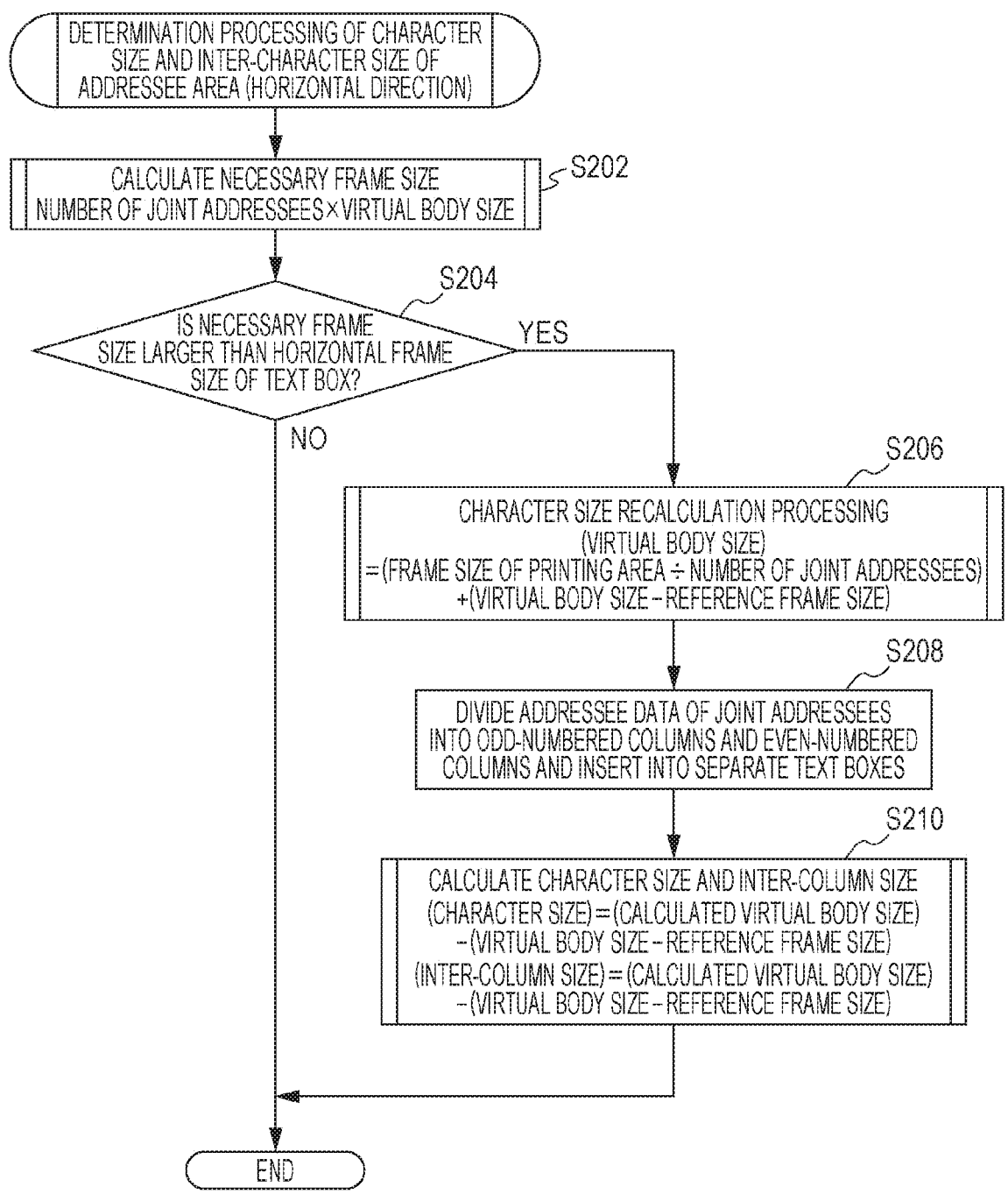
FIG. 3 is a flowchart of a determination processing of a character size and an inter-character size in a horizontal direction of an addressee area by the printing apparatus.

FIG. 3 is a flowchart of a determination processing of a character size and an inter-character size in a horizontal direction of an addressee area. Note that, the following processing corresponds to a processing of inputting characters of an addressee and is realized by a text input program 26. In each step, an individual processing of inputting the characters of the addressee corresponds to an input unit.

The addressee area corresponds to an addressee input filed, and when it is a postcard or an envelope as a printing medium, it is an area that is suitable for writing an addressee and indicates a portion in which the above-described printing area is set. In the printing area, one or more text boxes are prepared. The text box may protrude from the printing area. In a case of the present embodiment, the text box is made larger by the difference between the virtual body and the reference frame for the printing area, as the virtual body is larger than the reference frame. Since the virtual body is also a frame, the virtual body may be expressed as a virtual body frame. The reference frame corresponds to an inner frame of a character, and the virtual body corresponds to an outer frame of the character.

In step S202, the control unit 21 calculates a necessary frame size. The necessary frame size is a size of the text box necessary when adopting a default size as a character size. In a case where the character size matches the reference frame, when expanding the font data, the font data is expanded such that the frames of the virtual body larger than the reference frame do not overlap each other between adjacent characters. Therefore, in step S202, the necessary frame size in the horizontal direction of the addressee area is, $$\text{the number of joint addressees} \times \text{virtual body size} \quad (1).$$

As an example, assume that the default character size is 20 mm. The reference frame size is a square area of side 20 mm and the virtual body size is 22 mm which is 10 percent increased. The reference frame size is a length of one side of the reference frame, and the virtual body size is a length of one side of the virtual body. Note that, increasing by 10 percent is only an example, and the virtual body size is at least larger than the reference frame size.

In the addressee data, in a case where a plurality of names to be joint addressees are registered as a destination, since the number of joint addressees is printed with line feeds, the necessary frame size is as shown in expression (1). If the number of joint addressees is six, the necessary frame size is, 6 (number of joint addressees)×22 mm (virtual body size)=132 mm. As described above, since the width of the text box is larger by the difference between the virtual body and the reference frame, assuming that the width of the printing area of the addressee is 120 mm then the width of the text box is 122 mm.

In step S204, the control unit 21 determines whether the necessary frame size as the calculation result is larger than the horizontal frame size of the text box corresponding to the printing area. In this case, since the necessary frame size is 132 mm and the horizontal frame size of the text box is 122 mm, the control unit 21 determines YES in step S204 and executes a character size recalculation processing in step S206.

The character size recalculation processing calculates the virtual body size by a technique different from the technique of the related art. Then, the character size is specified later from the virtual body size.

$$(\text{virtual body size}) = (\text{frame size of printing area}/\text{number of joint addressees}) + (\text{virtual body size} - \text{reference frame size}) \quad (2).$$

The virtual body size calculated in step S206 is also referred to as a calculated virtual body size. By applying the above example, the calculated virtual body size is, 120 mm (frame size of printing area)/6 (number of joint addressees)+(22 mm−20 mm)=22 mm. If the calculated virtual body size is 22 mm then the character size is 20 mm. As a matter of course, it will exceed the horizontal width of the printing area as it is. The control unit 21 divides addressee data of the joint addresses into odd-numbered columns and even-numbered columns, and inserts into separate text boxes, in step S208.

In this example, the default virtual body size and the reference frame size to be assigned to the right side of the expression (2) are determined respectively. However, in step S206, the control unit 21 may calculate the virtual body size as follows based on a general ratio between the virtual body size and the reference frame size.

$$(\text{virtual body size}) = (\text{frame size of printing area}/\text{number of characters}) \times ((\text{virtual body size})/(\text{reference frame size})) \quad (3).$$

In the embodiment, the ratio, (virtual body size)/(reference frame size) which is the ratio on the right side of the expression (3) is, for example, 1.1. Further, the (number of characters) in the expression (3) is the number of characters to be accommodated in the printing area in a direction corresponding to the character size and the inter-character size to be obtained (horizontal direction) in the flowchart of FIG. 3, and according to the explanation so far, the number of joint addressees corresponds.

Note that, if the division is not divisible, decimals below the decimal point may be truncated.

FIG. 4A, FIG. 4B, FIG. 4C, and FIG. 4D are schematic diagrams showing a specific image of the determination processing of the character size and the inter-character size of the addressee area.

Figures 4A, 4B, 4C, 4D:
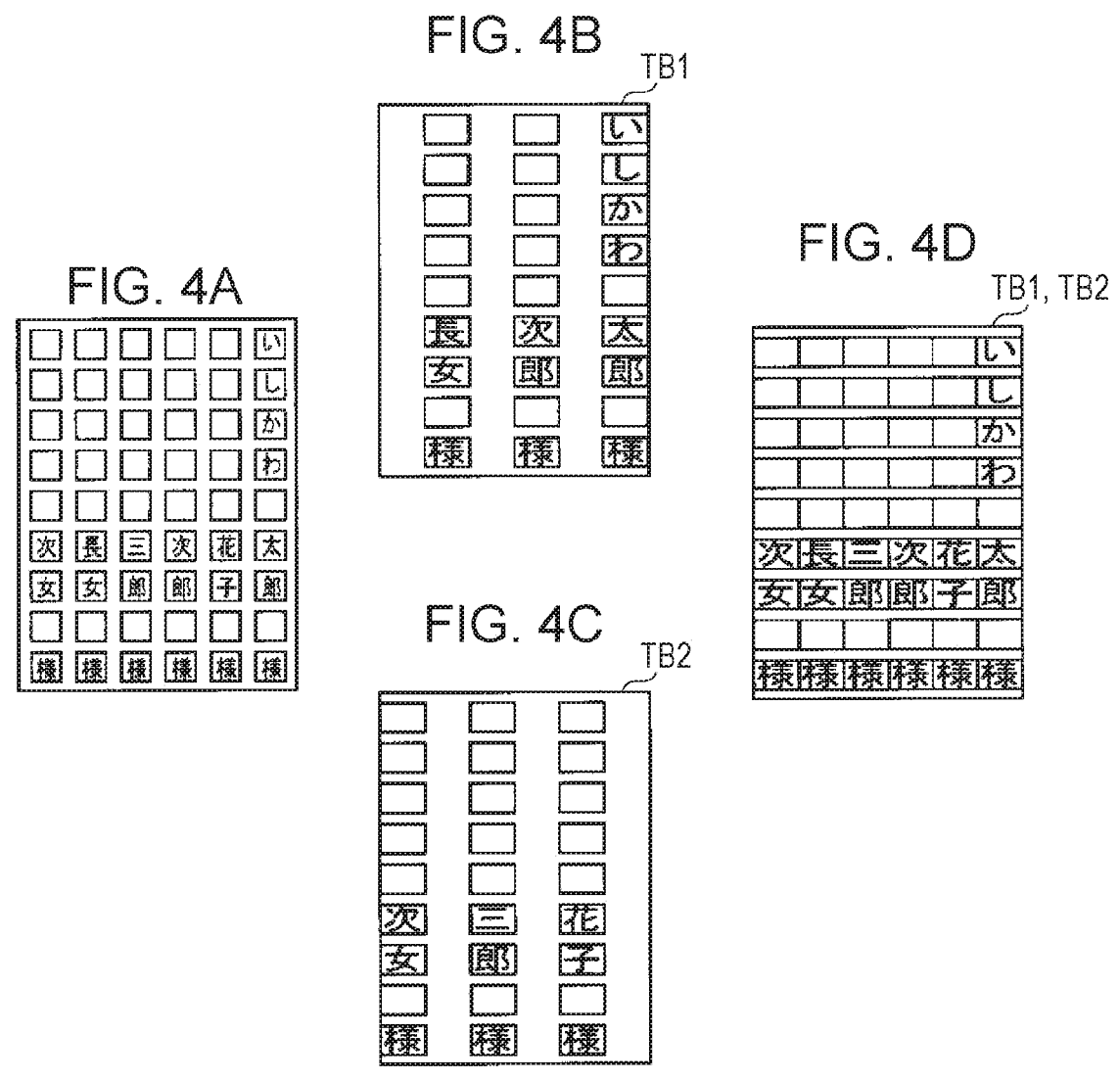

As shown in FIG. 4A, it is assumed that the number of joint addressees of the addressee data is 6, means there are 6 joint addressees. The last name is common for "いしかわ", it is rendered only in the first column, however, the rules for displaying the last name can be changed as appropriate. Regarding the first name, "太郎" is the first column, "花子" is the second column, "次郎" is the third column, "三郎" is the fourth column, "長女" is the fifth column, and "次女" is the sixth column. Dividing into odd-numbered columns and even-numbered columns means that in step S208, the control unit 21 takes the columns of "太郎", "次郎", and "長女" out of the first column, the third column, and the fifth column which are odd columns and inserts into the first text box with three columns, and also the control unit 21 takes the columns of "花子", "三郎", and "次女" out of the second column, the fourth column, and the sixth column which are even columns and inserts into the second text box with three columns.

In step S210, the control unit 21 calculates the character size and the inter-column size using the virtual body size calculated in step S206.

$$(\text{character size}) = (\text{calculated virtual body size}) - (\text{virtual body size} - \text{reference frame size}) \quad (4),$$

$$(\text{inter-column size}) = (\text{calculated virtual body size}) - (\text{virtual body size} - \text{reference frame size}) \quad (5).$$

The inter-column size is a gap between a character and a character, however in this example it is based on the reference frame size, so the inter-column size indicates a gap between a reference frame of a character of a certain column and a reference frame of a character of an adjacent column for adjacent inter-column in one text box.

In the above-described specific example, the character size is 20 mm according to the expression (4), and the inter-column size is, 22−(22−20)=20 according to the expression (5), accordingly the inter-column size is also 20 mm.

Although it is called an inter-column for the horizontal adjustment, the inter-column is just an example of an inter-character size. Note that, the expressions (4) and (5) are merely examples of calculation expressions for determining the character size and the inter-column size. For example, the control unit 21 may simply set a value obtained by dividing a frame size of the printing area by the number of joint addressees as a character size and an inter-column size.

The control unit 21 reflects the character size and the inter-character size (inter-column size) in properties of each text box. If it is reflected in the properties of each text box, fonts are expanded with the specified character size and inter-character size when characters are inserted into the text box thereafter.

Figure 5:
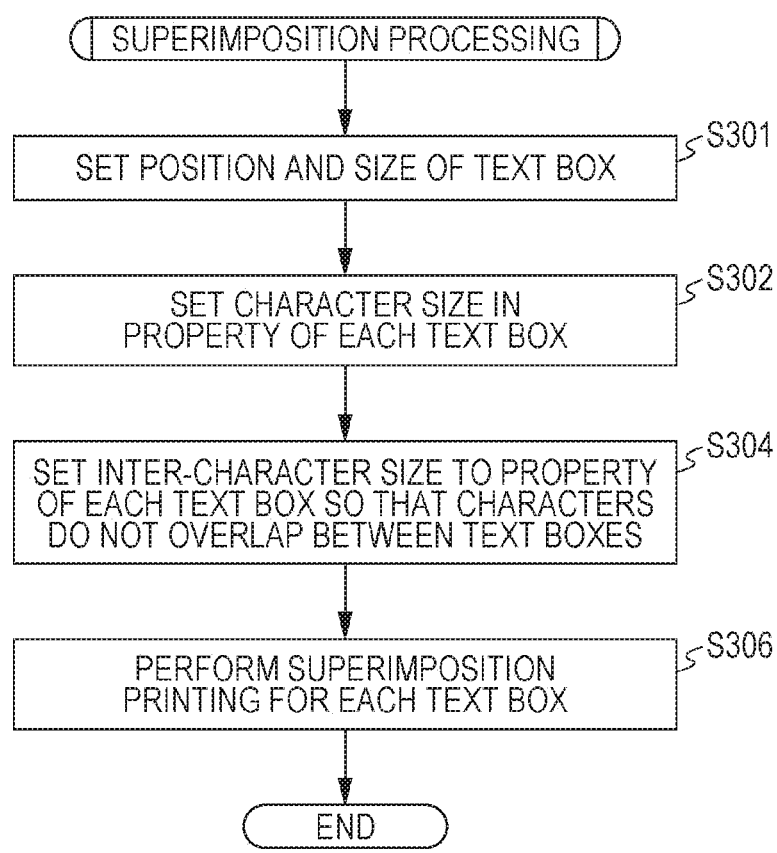
FIG. 5 is a flowchart showing a superimposition processing.

FIG. 5 is a flowchart showing a superimposition processing to be executed after the control unit 21 has completed the flowchart of FIG. 3 through step S210. On the premise that each text box is superimposed at a predetermined position, a predetermined superimposition processing can be realized by using properties set in each text box.

In step S301, the control unit 21 sets a position and a size of each text box. Since the virtual body is inevitably set for the font data having the reference frame, in order to adjust the printing position of the reference frame, it is necessary to set the position and the size of the text box after considering the influence of the virtual body. Specifically, the position and the size of the text box are set so that the reference frame is arranged at the corner of the printing area and the text box is larger than the printing area by the difference between the virtual body and the reference frame.

In step S302, the control unit 21 sets the character size calculated in step S210 in the property of each text box. Setting the character size calculated in step S210 to the property of each text box eventually means that, in each text box, a reference frame corresponding to the character size calculated in step S210 and a virtual body having a predetermined size ratio or a predetermined size difference with respect to this reference frame are set. In the following step S304, the control unit 21 sets the inter-character size calculated in step S210 in the property of each text box so that characters do not overlap between text boxes. Thereafter, in step S306, the control unit 21 performs a superimposition printing for each text box.

When characters are not overlapped between text boxes, the text box is superimposed so that the reference frames of adjacent characters are in contact with each other. In other words, when the text box is superimposed so that the reference frames of adjacent characters are in contact with each other, the characters do not overlap between the text boxes.

When setting the inter-character size, an inter-column may be placed on the left of the character as usual for the odd-numbered column. The result is shown in FIG. 4B. However, assuming that each text box is overlapped and set at the same position, if an inter-column also placed on the left of the character for the even-numbered column, the characters of the odd-numbered column and the characters of the even-numbered column overlap each other. Therefore, in order to set the inter-character size in the property to avoid overlapping of characters between text boxes, set the property so that a margin part between characters (inter-column) is placed on the right of the character for the even-numbered column. The result is shown in FIG. 4C.

Since the text box TB1 shown in FIG. 4B and the text box TB2 shown in FIG. 4C are superimposed at the same position, when printing, as shown in FIG. 4D, the text boxes TB1 and TB2 are superimposed and printed while the reference frames of the characters of the odd-numbered columns and the even-numbered columns adjacent each other are in contact with each other. A plurality of rectangles in character units in each of the text boxes TB1 and TB2 indicate a reference frame having a horizontal width corresponding to the character size set in the property of the text box in step S302, that is, the character size calculated in step S210.

As a technique for preventing characters from overlapping between text boxes, the text box itself may be offset in addition to place inter-columns to the left or right of the characters in each text box. In a case where an inter-column created in each text box is placed on the left of the characters, it is sufficient to offset the text box inserting characters of the even-numbered column to the left by the inter-column size with respect to the text box inserted characters of the odd-numbered column. This also makes it possible to "prevent characters from overlapping between text boxes."

As described above, according to the embodiment, in the printing apparatus 10, the processor, that is, the control unit 21 receives an input of a character string from a user and allocates characters of the character string to at least two text boxes so that adjacent characters are inserted in separate text boxes. For example, the character string is divided into an odd-numbered column and an even-numbered column, one of the odd-numbered column and the even-numbered column is allocated to a first text box, and the other is allocated to a second text box. Then, the control unit 21 sets the character size and the inter-character size in the text box so that the reference frame of the character of the odd-numbered column and the reference frame of the character of the even-numbered column adjacent to each other are in contact with each other. In this case, within each text box, the character size and the inter-character size are set so that the inter-character matches the reference frame size, that is, the character size.

Then, the control unit 21 superimposes a plurality of text boxes so that the reference frames of adjacent characters are in contact with each other, and causes the printing mechanism 23 to print a superimposition result. When the first text box contains odd-numbered columns and the second text box contains even-numbered columns, the control unit 21 may superimpose such that the character portion of one text box overlaps the inter-column portion of the other text box. In the related art, even if an inter-column size is set to be zero, there is a gap between adjacent characters due to an influence of the virtual body, and since a character size that fits in a printing area is determined on the premise that a gap is secured, accordingly, it is often not possible to use characters of the expected size (for example, character of a default size). However, by adopting the configuration of the embodiment, every other line or every other character in the original character string is inserted into each text box, so it becomes unnecessary to size down the character size due to an influence of the virtual body in each text box. Therefore, it is possible to print with characters of the expected size or characters as close as possible to the expected size.

Figure 6A:
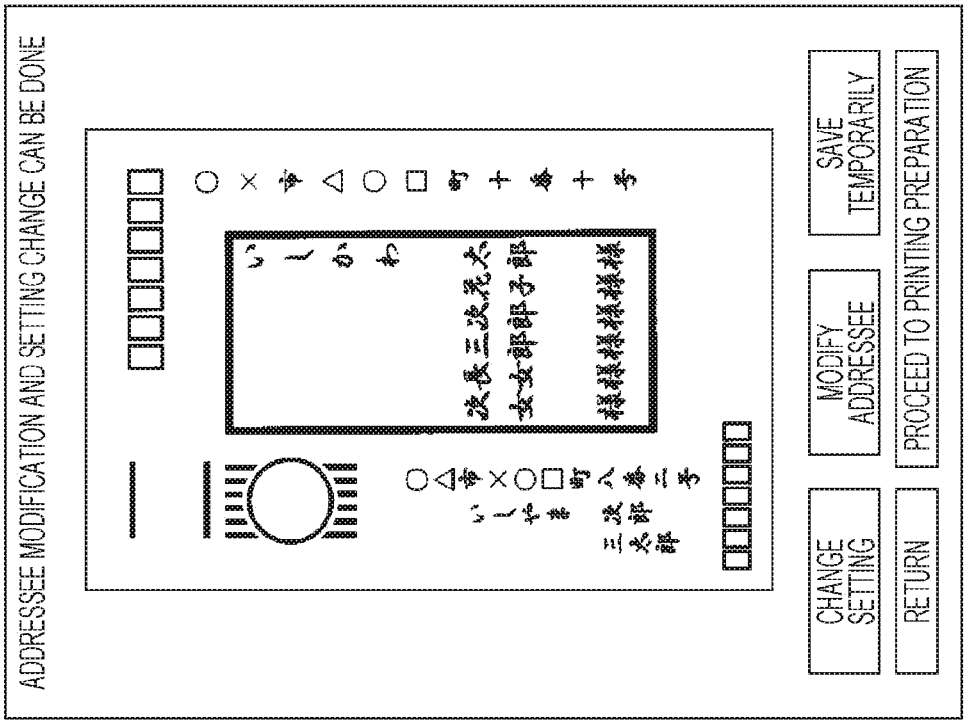
FIG. 6A and FIG. 6B are diagrams showing a comparison of printing results of the addressee area.
Figure 6B:
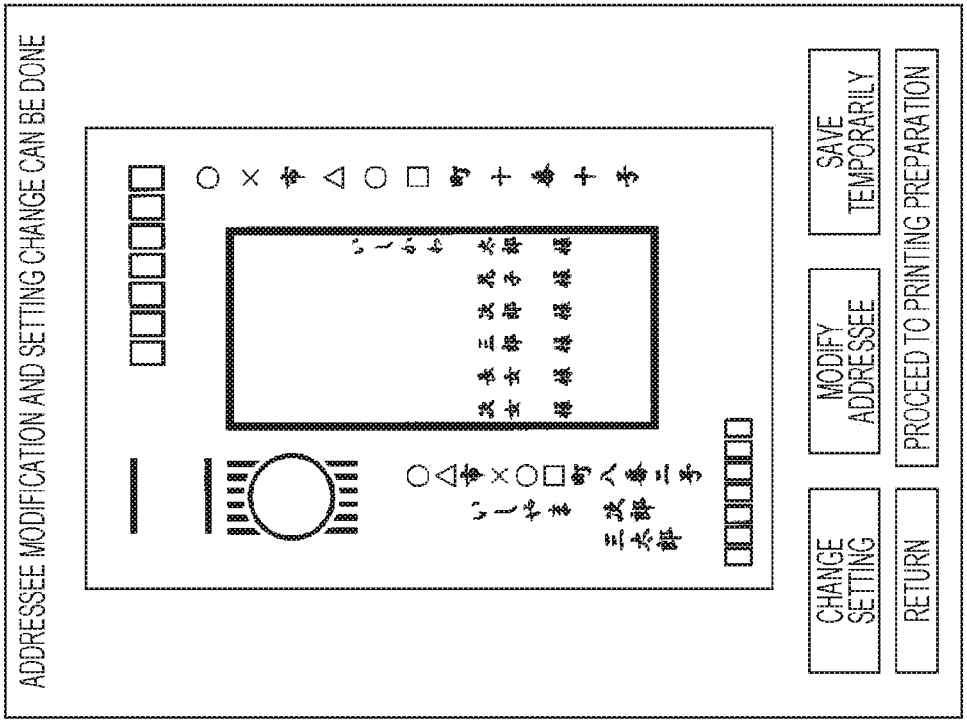

FIG. 6A and FIG. 6B are diagrams showing a comparison of printing results of the addressee area.

FIG. 6A shows a result of a printing with a smaller character size due to gaps between characters in adjacent columns when there is no inter-column (inter-column=0) by using a technique of the related art. In comparison, FIG. 6B shows a result when printing with enlarged characters in a limited printing area by using the technique of the embodiment. In this way, it is possible to set the character size in a state in which adjacent characters are maximally close to each other without being affected by a gap generated between the virtual body and the reference frame.

From a viewpoint of setting as large a character size as possible within a limited printing area, as described above, it is reasonable to set the character size and the inter-character size in each text box so that the reference frame of adjacent characters are in contact with each other when superimposing. However, in the embodiment, it is not limited that the reference frame on one text box side and the reference frame on the other text box side always contact with each other when the text boxes are superimposed. That is, the embodiment also includes a mode in which a gap is generated between reference frames of adjacent characters when text boxes are superimposed.

However, there is no effect of the embodiment in a gap similar to the related art in which such a gap is secured by each virtual body provided corresponding to each adjacent character. In the embodiment, the control unit 21 sets the character size and inter-character size in each text box so that a part of the virtual body of the other character is placed inside the virtual body of one adjacent character when each text box is superimposed. For example, in step S210, the control unit 21 further sets the calculated character size to a value that is smaller than the calculated inter-character size by a predetermined amount, so that a part of the virtual body of the other character can be placed inside the virtual body of one adjacent character when each text box is superimposed. The fact that a part of the virtual body of the other character is placed inside the virtual body of one adjacent character means that a part of the virtual body of one adjacent character and a part of the virtual body of the other character overlap each other.

That is, in the embodiment, the control unit 21 provides a concept of allocating characters of a character string to at least two text boxes so that adjacent characters are placed in separate text boxes, setting a character size and an inter-character size in the text box so that a part of an outer frame of an adjacent character is placed inside an outer frame of a character, superimposing the text box so that the part of the outer frame of the adjacent character is placed inside the outer frame, and controlling the printing mechanism 23 to print. As a part of such a concept, the control unit 21 provides a configuration in which the text boxes are superimposed so that the inner frames of adjacent characters are in contact with each other. Also, the control unit 21 may allocate characters of a character string to at least two text boxes so that adjacent characters are placed in separate text boxes, set a character size and an inter-character size in the text box so that a part of an inner frame of an adjacent character is placed inside an outer frame of a character, superimpose the text box so that the part of the inner frame of the adjacent character is placed inside the outer frame, and control the printing mechanism 23 to print.

MODIFICATION EXAMPLE

Several modification examples included in the embodiment will be described below. With respect to each modification example, descriptions of contents common to the embodiments already described are omitted as appropriate.

Modification Example 1

In the example described above, characters are inserted into two text boxes separately based on the length of the horizontal width. However, the problem of whether or not to be accommodated in a predetermined printing area also occurs in a vertical direction. That is, the vertical direction is a normal character alignment direction. The above-described column alignment direction and the character alignment direction of an addressee are orthogonal directions.

Therefore, similar determination on the length in the horizontal width can also be applied to the length in the vertical direction. Specifically, the processing of "calculate the necessary frame size" performed in step S202 is calculated in the vertical direction which is the character alignment direction and the determination performed in step S204 is set to whether or not "a necessary frame size of a vertical direction is larger than a vertical frame size of a printing area", and when the necessary frame size is larger than the vertical frame size, in step S206, the virtual body size is calculated based on the vertical direction. Specifically, $$\text{(virtual body size)} = \text{(frame size of printing area/number of rows in vertical direction)} + \text{(virtual body size} - \text{reference frame size)} \quad (6).$$

That is, the difference from expression (2) is that the number of joint addressees corresponding to the number of columns has been replaced by the number of rows in the vertical direction.

Therefore, in step S208, instead of the processing in which the joint addressee is divided into odd-numbered columns and even-numbered columns and inserted into separate text boxes, each character data constituting the addressee is divided into odd-numbered rows and even-numbered rows and inserted into separate text boxes, and the character size and the inter-character size calculated in step S210 may be calculated in the same way.

FIG. 7A, FIG. 7B, FIG. 7C, and FIG. 7D are schematic diagrams showing a specific image of the determination processing of the character size and the inter-character size of the addressee area in a vertical direction.

As shown in FIG. 7A, the number of characters (number of rows) in the vertical direction of the addressee data is 9 rows, FIG. 7B shows a state in which odd-numbered rows are inserted in the first text box TB3, and FIG. 7C shows a state in which even-numbered rows are inserted in the second text box TB4 so that characters do not overlap. Since the text box TB3 shown in FIG. 7B and the text box TB4 shown in FIG. 7C are superimposed at the same position, when printing, as shown in FIG. 7D, the text boxes TB3 and TB4 are superimposed and printed while the reference frames of the characters of the odd-numbered rows and the even-numbered rows adjacent each other are in contact with each other.

The control unit 21 can independently apply a horizontal direction processing and a vertical direction processing, respectively. In the horizontal direction processing, the control unit 21 allocates the input character string to two text boxes as shown in FIGS. 4B, 4C, and 4D, determines the character size and the inter-character size in the horizontal direction of the printing area, and superimposes the text boxes. In the vertical direction processing, the control unit 21 allocates the input character string to two text boxes as shown in FIGS. 7B, 7C, and 7D, determines the character size and the inter-character size in the vertical direction of the printing area, and superimposes the text boxes. For example, the control unit 21 executes the horizontal direction processing and then further executes the vertical direction processing, on the input character string. In this manner, when both of the horizontal direction processing and the vertical direction processing are performed, it is allocated in four alignment directions in the character alignment direction of the addressee and the orthogonal direction.

Modification Example 2

In the example described above, the control unit 21 determines whether or not the necessary frame size is larger than the horizontal frame size of the text box corresponding to the printing area. When the necessary frame size is larger than the horizontal frame size of the text box, in principle, the character size is reduced, unless the above-described processing is executed. Therefore, in a case where the necessary frame size is larger than the horizontal frame size of the text box, the character size when the addressee is placed in one text box becomes smaller. For this reason, attention is paid to the character size in a case where the addressee is inserted in one text box in advance, the control unit 21 may determine whether the character size in the case where the addressee is inserted in one text box is less than a threshold value or greater than or equal to the threshold value. In the above example, if the character size in the case where the addressee is inserted in one text box is less than 20 mm, the control unit 21 may perform a processing of allocating the characters of the addressee to at least two text boxes. On the other hand, if the character size in the case where the addressee is inserted in one text box is 20 mm or more, the control unit 21 allocates the addressee to one text box.

Modification Example 3

Up to now, it is described as an example when the character string to be rendered and printed in the printing area by the control unit 21 is Japanese. However, it is also assumed that English characters or the like are printed as a character string.

Figure 8:
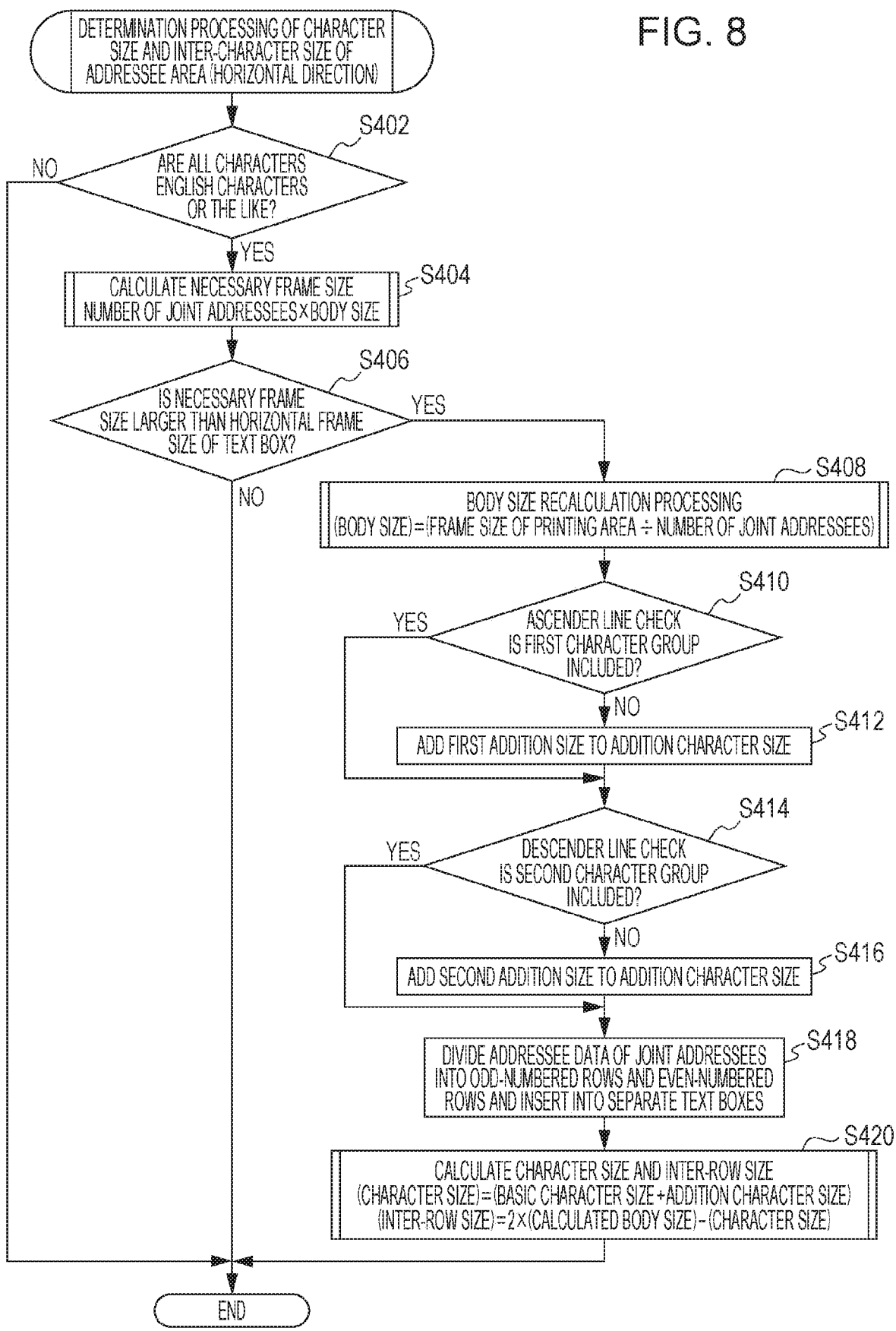

As one modification of the embodiment, FIG. 8 is a flowchart showing the determination processing of the character size and the inter-character size of English characters or the like in the printing area. The processing of FIG. 8 is also realized by the text input program 26. In the description relating to FIG. 8, it is assumed that the printing area is an addressee area, and the addressee is rendered with joint addressees in the addressee area.

In step S402, the control unit 21 determines whether or not character strings, that is, all characters constituting the addressee data to be rendered correspond to English characters or the like. The English characters or the like mean, for example, capital characters, lowercase characters of 26 kinds of alphabets, symbols used in English sentences, and characters used in each language of Latin language. When all the characters constituting the addressee data to be rendered correspond to English characters or the like, the control unit 21 calculates the necessary frame size in step S404. On the other hand, if the characters constituting the addressee data to be rendered include characters not corresponding to English characters or the like, the control unit 21 determines NO in step S402 and terminates the flowchart of FIG. 8.

The control unit 21 calculates the necessary frame size by the following expression (7).

$$\text{necessary frame size} = \text{number of joint addressees} \times \text{body size} \quad (7).$$

Comparing the expression (7) with the expression (1), the virtual body size is merely replaced by the body size.

Figure 9:
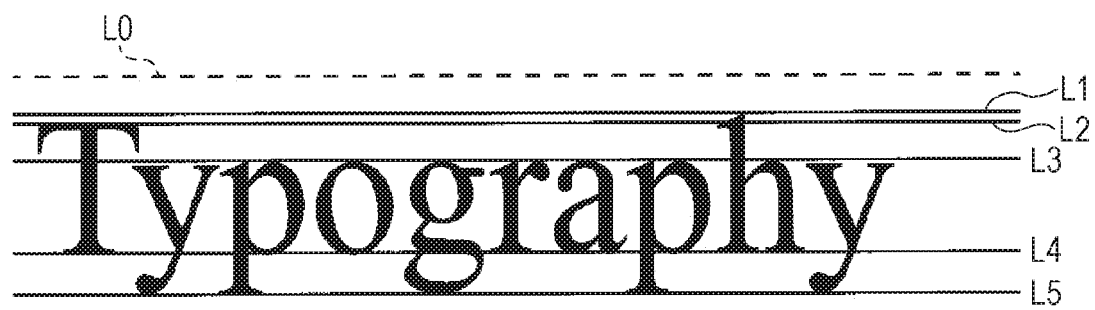
FIG. 9 is a diagram showing a relationship between font data of a European language typeface and a reference line.

FIG. 9 shows the relationship between the font data of the European language typeface such as the alphabet and the reference lines L1 to L5. As for font data of the European language typeface, an ascender line L1, a cap line L2, a mean line L3, a base line L4, and a descender line L5 are defined in order from the top to the bottom in the height direction of a character. The ascender line L1 is a reference line indicating the uppermost position such as, for example, the lowercase characters "b", "d", "f", "h", "k", "l", "t". The cap line L2 is a reference line indicating the uppermost position of the capital characters. The mean line L3 is a reference line indicating the height of lowercase characters. The base line L4 is a reference line of the European language typeface and indicates the position of the bottom of capital characters and a lot of the bottom of lowercase characters.

The height from the base line L4 to the mean line L3 is called x-height. The height from the base line L4 to the cap line L2 is called a cap height. A part of lowercase characters and above the mean line L3 is called an ascender. A part of lowercase characters and below the base line L4 is called a descender. The descender line L5 is a reference line indicating the lowermost position such as, for example, the lowercase characters "f", "g", "j", "p", "q", "y". The height from the descender line L5 to the ascender line L1 is the body size. A predetermined default value for such a body size is used as a body size in expression (7).

In step S406, the control unit 21 determines whether or not the necessary frame size calculated in step S404 is larger than the horizontal frame size of the text box having a predetermined size corresponding to the printing area. In Modification Example 3, the text box corresponding to the printing area may be the same size as the printing area. Here, it is assumed that character strings based on English characters are printed on a printing medium such as postcards or envelopes after being rotated by 90 degrees. In this case, since the character alignment direction in English is printed so as to correspond to the vertical direction of the printing area, the height direction of the character corresponds to the horizontal direction of the printing area. Accordingly, if the necessary frame size calculated in step S404 is larger than the horizontal width of the text box corresponding to the printing area, the control unit 21 determines YES in step S406, and proceeds to step S408.

In step S408, the control unit 21 calculates the body size by the following expression (8). In other words, in a situation where the default value of the body size is defined, the body size is calculated again.

$$\text{(body size)} = \text{(frame size of printing area/number of joint addressees)} \quad (8).$$

Also in Modification Example 3, if the frame size of the printing area, that is, the horizontal width of the printing area is 120 mm and the number of joint addressees is 6, as in the above-described embodiment, the body size calculated in step S408 is 20 mm. For the sake of convenience, the body size calculated in step S408 is referred to as a calculated body size. The calculated body size is smaller than the body size (default value of the body size) used in the expression (7). As an example, assume that the default value of the body size is 25 mm. Also, in the default value of the body size, it is assumed that the cap height is 20 mm, the height from the cap line L2 to the ascender line L1 is 1 mm, and the height from the descender line L5 to the base line L4 is 4 mm.

In Modification Example 3, a frame in which the ascender line L1 and the descender line L5 are both ends in the height direction of the character is referred to as an outer frame of the character. Further, a frame in which the cap line L2 and the base line L4 are both ends in the height direction of the character is called an inner frame of the character. That is, the frame having the body size as the width in the height direction of the character is the outer frame of the character, and the frame having the cap height as the width in the height direction of the character is the inner frame of the character.

In step S410, the control unit 21 determines whether or not a predetermined first character group that the ascender passes the cap line L2 toward the ascender line L1 is included in the characters constituting the addressee data to be rendered. The first character group includes characters such as the above-described lowercase characters "b", "d", "f", "h", "k", "l", "t". However, specific examples of the first character group are not limited to above-described lowercase characters. When no character included in the first character group is included in the characters constituting the addressee data, the control unit 21 determines NO and proceeds to step S412.

On the other hand, when at least one character included in the first character group is included in the characters constituting the addressee data, the control unit 21 determines YES, skips step S412, and proceeds to step S414. For the sake of convenience, the determination in step S410 is also referred to as an ascender line check.

In step S412, the control unit 21 adds the height from the cap line L2 to the ascender line L1 in the calculated body size to the addition character size. The height from the cap line L2 to the ascender line L1 in the calculated body size is referred to as a first addition size for convenience. At the point of starting the flowchart of FIG. 8, the value of the addition character size is reset to 0. Since the ratio of the distance between the reference lines L1, L2, L3, L4, and L5 in the body size is predetermined, the control unit 21 can calculate the first addition size by multiplying the calculated body size by the ratio of the distance between the cap line L2 and the ascender line L1 to the body size.

In step S414 executed after step S410 or step S412, the control unit 21 determines whether or not a descender includes a predetermined second character group that passes the base line L4 toward the descender line L5 in the characters constituting the addressee data to be rendered. The second character group includes characters such as the above-described lowercase characters "f", "g", "j", "p", "q", "y". However, specific examples of the second character group are not limited to above-described lowercase characters. When no character included in the second character group is included in the characters constituting the addressee data, the control unit 21 determines NO and proceeds to step S416. On the other hand, when at least one character included in the second character group is included in the characters constituting the addressee data, the control unit 21 determines YES, skips step S416, and proceeds to step S418. For the sake of convenience, the determination in step S414 is also referred to as descender line check.

In step S416, the control unit 21 adds the height from the descender line L5 to the base line L4 in the calculated body size to the addition character size. The height from the descender line L5 to the base line L4 in the calculated body size is referred to as a second addition size for convenience.

The control unit 21 can calculate the second addition size by multiplying the calculated body size by the ratio of the distance between the descender line L5 and the base line L4 to the body size.

In step S418 executed after step S414 or step S416, the control unit 21 divides the addressee data of the joint addressees into odd-numbered rows and even-numbered rows and inserts divided rows into separate text boxes.

FIG. 10A, FIG. 10B, FIG. 10C, and FIG. 10D are schematic diagrams showing a specific image of the determination processing of the character size and the inter-character size of the addressee area in Modification Example 3.

As shown in FIG. 10A, it is assumed that the number of joint addressees of the addressee data is 6, means there are 6 joint addressees. Specific addresses are as follows: "Braian Ace" is a first row, "Luwis Senna" is a second row, "Aran Ness" is a third row, "Nico Lovin" is a fourth row, "Bon Jovi" is a fifth row, and "Lauren Panis" is a sixth row. In FIG. 10A, FIG. 10B, FIG. 10C, and FIG. 10D, the character alignment direction (longer direction of the row) is drawn in the horizontal direction. However, as described above, the direction orthogonal to the character alignment direction corresponds to the horizontal direction of the addressee area (printing area). Dividing into odd-numbered rows and even-numbered rows means that in step S418, the control unit 21 takes the rows of "Braian Ace", "Aran Ness", and "Bon Jovi" out of the first row, the third row, and the fifth row which are odd rows and inserts into the first text box with three rows, and also the control unit 21 takes the rows of "Luwis Senna", "Nico Lovin", and "Lauren Panis" out of the second row, the fourth row, and the sixth row which are even columns and inserts into the second text box with three rows.

In step S420, the control unit 21 calculates the character size and the inter-row size based on the addition character size and the calculated body size. Specifically, the control unit 21 sets a value obtained by adding the addition character size to the height of the cap height in the calculated body size, that is, the height from the base line L4 to the cap line L2 as the calculated character size in step S420. For the sake of convenience, the cap height in the calculated body size is referred to as basic character size. By multiplying the calculated body size by the ratio of the distance between the base line L4 and the cap line L2 to the body size, the basic character size can also be calculated.

That is, the control unit 21 sets, $$(\text{character size}) = (\text{basic character size} + \text{addition character size}) \quad (9).$$

Further, the control unit 21 obtains the inter-row size as, $$(\text{inter-row size}) = 2 \times (\text{calculated body size}) - (\text{character size}) \quad (10).$$

As can be understood from the explanation regarding steps S410 to S416, the addition character size at the time of step S420 is either 0, first addition size, second addition size, first addition size+second addition size. Therefore, the character size obtained as the calculation result in step S420 is either basic character size, basic character size+first addition size, basic character size+second addition size, basic character size+first addition size+second addition size. Basic character size+first addition size+second addition size is equal to the calculated body size.

Therefore, if, character size=basic character size+first addition size+second addition size, both the character size and the inter-row size are equal to the calculated body size.

On the other hand, if, character size=basic character size+first addition size, the inter-row size is larger than the character size, and is the value obtained by adding the second addition size to the calculated body size.

Also, if, character size=basic character size+second addition size, the inter-row size is larger than the character size, and is the value obtained by adding the first addition size to the calculated body size.

If, character size=basic character size, the inter-row size is also larger than the character size, and is the value obtained by adding the first addition size and the second addition size to the calculated body size. In the case where, character size=basic character size, it corresponds to a case where enlargement of the inner frame as described later cannot be realized.

Also in Modification Example 3, the control unit 21 executes basically the same processing as the superimposition processing shown in FIG. 5. In step S301, the control unit 21 may set each text box having the same size as the printing area so that the outer frame of the character is arranged at the corner of the printing area. In step S302, the control unit 21 sets the character size calculated in step S420 as the cap height in the property of each text box. Setting the character size calculated in step S420 to the cap height in the property of each text box means that in each text box, the cap height corresponding to the character size calculated in step S420 and the body size of a predetermined ratio to the cap height are set, at the same time.

According to the above specific example, the default value of the body size is 25 mm, the cap height at the default value is 20 mm, and the calculated body size is 20 mm. If the character size and the inter-row size calculated in step S420 are equal and if the size of the character and the inter-row is a value obtained by adding the first addition size and the second addition size to the basic character size, the character size=20 mm. In this case, the setting of the cap height in each text box is set to 20 mm by the processing of step S302, and it is a value equivalent to the cap height in the body size of the default value.

In the following step S304, the control unit 21 sets the inter-row size, that is, the inter-character size calculated in step S420 in the property of each text box so that characters do not overlap between text boxes. Also in Modification Example 3, the inter-row size indicates the distance between the inner frame of the character of a certain row and the inner frame of the character of the row adjacent thereto in one text box. That is, within one text box, a gap which is the same as the cap height or wider than the cap height is set between the cap height of a certain row and the cap height of the next row. Thereafter, in step S306, the control unit 21 performs a superimposition printing for each text box. In the Modification Example 3, if, character size=inter-row size, the control unit 21 superimposes each text box so that the inner frames of the adjacent characters are in contact with each other when each text box is superimposed, so that the characters do not overlap between the text boxes. On the other hand, if, character size<inter-row size, the control unit 21 superimposes each text box so that gaps corresponding to the first addition size and the second addition size are secured between inner frames of adjacent characters when superimposing each text box, so that the characters do not overlap between the text boxes.

FIG. 10A illustrates a state in which the addressee data of six joint addressees is arranged by adjusting the outer frame of each character, that is, body size to be all within the text box corresponding to the printing area. A rectangle in character unit in FIG. 10A indicates a frame in which the inner frame of the character, that is, the width in the height direction of the character is set as the cap height. Broken lines in FIG. 10A indicates a boundary between adjacent rows. The broken lines may be regarded as combining the descender line of one adjacent row and the ascender line of the other adjacent row. That is, a gap between the broken line and the broken line shown in FIG. 10A is the body size for each row in FIG. 10A. More specifically, the gap between the broken line and the broken line shown in FIG. 10A corresponds to the calculated body size in step S408.

FIG. 10B shows the text box TB5 which has been subjected to the processing up to the step S304 after inserting the addressee of the odd-numbered rows and FIG. 10C shows the text box TB6 which has been subjected to the processing up to the step S304 after inserting the addressee of the even-numbered rows. FIGS. 10B and 10C are diagrams assuming that the character sizes and the inter-row sizes calculated in step S420 are equal. A rectangle in character unit in FIGS. 10B and 10C indicates a frame in which the inner frame of the character, that is, the width in the height direction of the character is set as the cap height set in step S302. According to the example of FIGS. 10B and 10C, the inner frame of the character is enlarged in the height direction of the character rather than the cap height in the calculated body size, and is a frame having a gap (distance between the broken line and the broken line shown in FIG. 10A) corresponding to the calculated body size.

Since the text box TB5 shown in FIG. 10B and the text box TB6 shown in FIG. 10C are superimposed at the same position, when printing, as shown in FIG. 10D, the text boxes TB5 and TB6 are superimposed and printed while the inner frames of the characters of the odd-numbered rows and the even-numbered rows adjacent each other are in contact with each other.

If the character size calculated in step S420 is, basic character size+first addition size, a gap corresponding to the second addition size is generated between one inner frame of character and the other inner frame of character adjacent to each other when the text boxes are superimposed. However, since the descender of the above-mentioned one character is rendered with respect to the gap, eventually, when a text box is superimposed, there is no unnecessary gap between one character and the other character adjacent to each other. If the character size calculated in step S420 is, basic character size+second addition size, a gap corresponding to the first addition size is generated between one inner frame of character and the other inner frame of character adjacent to each other when the text boxes are superimposed. However, since the ascender of the above-mentioned the other character is rendered with respect to the gap, eventually, when a text box is superimposed, there is no unnecessary gap between one character and the other character adjacent to each other.

As described above, according to the Modification Example 3, when executing control to print a character string by English characters or the like, the control unit 21 determines, by the ascender line check, whether or not the character string includes the first character group which is necessary for rendering an area from the cap line L2 to the ascender line L1, and the control unit 21 also determines, by the descender line check, whether or not the character string includes the second character group which is necessary for rendering an area from the descender line L5 to the base line L4. If the first character group is not included in the character string, the control unit 21 adds the first addition size, which is the height from the cap line L2 to the ascender line L1, to the addition character size, and if the second character group is not included in the character string, the control unit 21 adds the second addition size, which is the height from the descender line L5 to the base line L4, to the addition character size. The control unit 21 determines the value obtained by adding the addition character size to the basic character size corresponding to the cap height as the character size, and determines the inter-row size according to the character size. Then, the character size and inter-row size are set to the cap height and inter-row size in the property of each text box to which characters are allocated. That is, by enlarging the inner frame, that is, the size of the cap height in the unnecessary area (area of the gap between the cap height and the body size) depending on the content of the English character or the like constituting the character string, it is possible to print large sized characters.

Note that, in Modification Example 3, when each text box is superimposed, the inner frames of the characters are not necessarily in contact with each other, and in the state shown in FIG. 10D, there may be a gap between the inner frame of the character of odd-numbered rows and the inner frame of the character of even-numbered rows. That is, in Modification Example 3, the control unit 21 also sets the character size and inter-character size in the text box so that a part of the outer frame or inner frame of the adjacent character is placed inside the outer frame of the character.

Modification Example 4

Modification Example 4 is a modified example on the premise of Modification Example 3.

Figure 11:
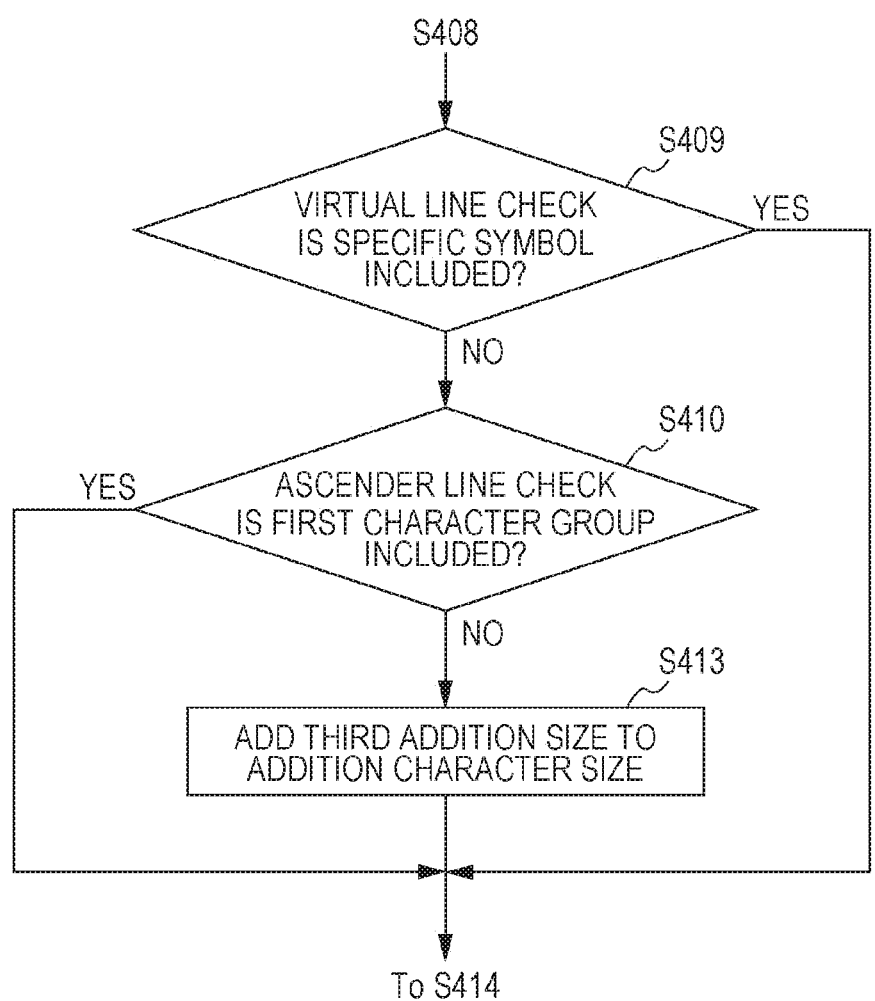
FIG. 11 is a diagram showing a part of a flowchart of a processing according to Modification Example 4 and showing differences from FIG. 8.
Figure 12:
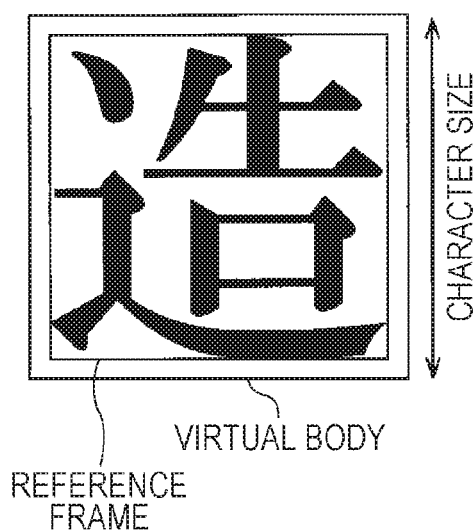
FIG. 12 is a schematic diagram showing a relationship between a reference frame and a virtual body in font data.

FIG. 11 is a part of a flowchart of the determination processing of the character size and the inter-character size relating to Modification Example 4, mainly showing differences from the flowchart of FIG. 8. For Modification Example 4, differences from Modification Example 3 will be described with reference to FIGS. 8, 9, and 11. In Modification Example 4, a reference line L0 indicated by the broken line in FIG. 9 is assumed. The reference line L0 is a reference line placed above the ascender line L1 in the height direction of the character and indicates the uppermost position to be added above the characters such as the alphabet, for example, pronunciation symbols called a hat or a caret and accent marks. Symbols added above characters are referred to as specific symbols in Modification Example 4. In other words, the specific symbol is a symbol that requires an area from the ascender line L1 to the reference line L0 to be rendered.

In Modification Example 3, the height from the descender line L5 to the ascender line L1 is set as the body size of the character. In Modification Example 4, the height from the descender line L5 to the reference line L0 is taken as the body size of the character. Therefore, in Modification Example 4, a frame in which the reference line L0 and the descender line L5 are both ends in the height direction of the character is referred to as an outer frame of the character.

After step S408, the control unit 21 executes step S409. In step S409, the control unit 21 determines whether or not the specific symbol is included in the addressee data to be rendered. When no specific symbol is included in the addressee data, the control unit 21 determines NO and proceeds to step S410. The processing of step S410 is as described above. On the other hand, when one or more specific symbols are included in the addressee data, the control unit 21 determines YES, skips steps S410 and S413, and proceeds to step S414. For the sake of convenience, the determination in step S409 is also referred to as virtual line check.

When the determination in step S410 is NO, the control unit 21 executes step S413. In Modification Example 4, step S413 is executed instead of step S412 in FIG. 8. In step S413, the control unit 21 adds the height from the cap line L2 to the reference line L0 in the calculated body size to the addition character size. The height from the cap line L2 to the reference line L0 in the calculated body size is referred to as a third addition size for convenience. Since the ratio of the distance between the reference lines L0, L1, L2, L3, L4, and L5 in the body size is predetermined, the control unit 21 can calculate the third addition size by multiplying the calculated body size by the ratio of the distance between the cap line L2 and the reference line L0 to the body size.

As can be understood from the explanation regarding steps S409 to S413 in FIG. 11 and steps S414 and S416 in FIG. 8, the addition character size at the time of step S420 is either 0, third addition size, second addition size, third addition size+second addition size. Therefore, the character size obtained as the calculation result in step S420 is either basic character size, basic character size+third addition size, basic character size+second addition size, basic character size+third addition size+second addition size. Basic character size+third addition size+second addition size is equal to the calculated body size. Therefore, if character size=basic character size+third addition size+second addition size, both the character size and the inter-row size are equal to the calculated body size.

As described above, according to Modification Example 4, the control unit 21 determines, by the virtual line check, whether or not the character string includes the specific symbol which is necessary for rendering an area from the ascender line L1 to the reference line L0 which is a character height above the ascender line L1. If the specific symbol and first character group are not included in the character string, the control unit 21 adds the third addition size, which is the height from the cap line L2 to the reference line L0, to the addition character size, and if the second character group is not included in the character string, the control unit 21 adds the second addition size, which is the height from the descender line L5 to the base line L4, to the addition character size. The control unit 21 determines the value obtained by adding the addition character size to the basic character size corresponding to the cap height as the character size, and determines the inter-row size according to the character size. Then, the character size and inter-row size are set to the cap height and inter-row size in the property of each text box to which characters are allocated. That is, by enlarging the inner frame, that is, the size of the cap height in the unnecessary area according to the condition such as the absence of a specific symbol, it is possible to print large sized characters. As described above, according to the embodiment, the control unit 21 provides a configuration for determining the inner frame in accordance with the presence or absence of a character or symbol requiring an area between the inner frame and the outer frame in the character string and superimposing text boxes.

The reference line L0 above the character height than the ascender line L1 is adopted in Modification Example 4. An idea similar to the third addition size replacing the first addition size is that when assuming a symbol to be added below the character, it can be adopted as the reference line below the character height than the descender line L5 and an addition size below the base line L4 replacing the second addition size.

Note that, the invention is not limited to the above embodiment. Although it is apparent to those skilled in the art, it is disclosed as one embodiment in the invention: to apply to characters (including numerals) used in any language, although not the characters disclosed in the above-mentioned embodiment; to realize the plurality of members disclosed in the above-mentioned embodiment by a single member, to realize a single member by a plurality of members, or to realize a plurality of apparatuses in cooperation with each other; to apply modifications in which mutually substitutable members and configurations and the like disclosed in the above-mentioned embodiment are appropriately combined; to appropriately replace members and configurations and the like, disclosed in the above-mentioned embodiments which are well-known technologies and not disclosed in the above-mentioned embodiment, with mutually substitutable members and configurations and the like, and modify the combination and apply; to appropriately replace members and configurations and the like, disclosed in the above-mentioned embodiment by those skilled in the art based on known technology and not disclosed in the above-mentioned embodiment, with members and configurations and the like that can be assumed as substitutes, and modify the combination and apply; to apply to arrangement of characters other than addressee; and to appropriately combine each modification example.

The entire disclosure of Japanese Patent Application No. 2018-1112, filed Jan. 9, 2018 is incorporated by reference herein.

The entire disclosure of Japanese Patent Application No. 2018-108058, filed Jun. 5, 2018 is incorporated by reference herein.

What is claimed is:

1. A printing apparatus comprising:
a printing mechanism that prints the character string inside a predetermined text box; and
a processor that controls the printing mechanism,
wherein the processor receives an input of a character string, allocates characters of the character string to at least two text boxes so that an adjacent character constituting the character string is inserted in a separate text box, sets a character size and an inter-character size in a text box so that a part of an outer frame of the adjacent character is placed inside an outer frame of a character and a part of the outer frame of the adjacent character is placed outside the outer frame of the character, and controls the printing mechanism so that the text box is superimposed and printed to place the part of the outer frame of the adjacent character inside the outer frame,
the two text boxes includes a first text box and a second text box, and
the processor controls the printing mechanism so that the text box is superimposed and printed to place a character portion of one of the first text box and the second text box and an inter-character portion of the other of the first text box and the second text box in an overlapping manner;
wherein the processor determines the character size based on a virtual body size calculated by the following expression:

(virtual body size)=(frame size of printing area/number of characters)×((virtual body size)/(reference frame size)).

2. The printing apparatus according to claim 1,
wherein the processor controls the printing mechanism so that the text boxes are superimposed and printed so that inner frames of adjacent characters are in contact with each other.

3. The printing apparatus according to claim 1,
wherein the outer frame is an ascender line and a descender line, and an inner frame of the character is a cap line and a base line.

4. The printing apparatus according to claim 1,
wherein the outer frame is a reference line placed above an ascender line in a character height and a descender line, and an inner frame of the character is a cap line and a base line.

5. The printing apparatus according to claim 1,
wherein the processor determines an inner frame according to whether a character or a symbol requiring an area between the inner frame of the character and the outer frame is present or not in the character string.

6. The printing apparatus according to claim 1,
wherein the processor inserts all the character strings into one text box if the character size when the character string is inserted in one text box is greater than or equal to a threshold value, and allocates the characters of the character string to at least two text boxes if the character size when the character string is inserted in one text box is less than the threshold value.

7. The printing apparatus according to claim 1,
wherein the processor allocates the characters of the character string in four alignment directions in a character alignment direction of the character string and a direction orthogonal to the character alignment direction of the character string when allocating the characters of the character string to at least two text boxes.

8. A printing apparatus comprising:
a printing mechanism; and
a processor,
wherein the processor receives an input of a character string from a user, allocates characters of the character string to at least two text boxes so that an adjacent character is inserted in a separate text box, sets a character size and an inter-character size in a text box so that a part of an outer frame of the adjacent character is placed inside an outer frame of a character, and controls the printing mechanism so that the text box is superimposed and printed to place the part of the outer frame of the adjacent character inside the outer frame,
wherein the outer frame is a virtual body, and an inner frame of the character is a reference frame,
wherein the processor determines the character size based on a virtual body size calculated by the following expression:

(virtual body size)=(frame size of printing area/number of characters)×((virtual body size)/(reference frame size)).

9. The printing apparatus according to claim 8,
wherein the processor determines the inter-character size based on the following expression:

(inter-character size)=(calculated virtual body size)−((virtual body size)−(reference frame size)).

10. A non-transitory storage medium for storing a text input program for causing a computer to realize:
a function of controlling a printing mechanism; and
a processor function,
wherein the processor function is to receive an input of a character string from a user, to allocate characters of the character string to at least two text boxes so that an adjacent character is inserted in a separate text box, to set a character size and an inter-character size in the text box so that a part of an outer frame of the adjacent character is placed inside an outer frame of a character and a part of the outer frame of the adjacent character is placed outside the outer frame of the character, and to control the printing mechanism so that the text box is superimposed and printed to place the part of the outer frame of the adjacent character inside the outer frame, the two text boxes includes a first text box and a second text box, and the processor function is further to control the printing mechanism so that the text box is superimposed and printed to place a character portion of one of the first text box and the second text box and an inter-character portion of the other of the first text box and the second text box in an overlapping manner;

wherein the processor function determines the character size based on a virtual body size calculated by the following expression:

$$(\text{virtual body size}) = (\text{frame size of printing area/number of characters}) \times ((\text{virtual body size})/(\text{reference frame size})).$$

* * * * *